P. F. COTA.
RESILIENT WHEEL.
APPLICATION FILED JAN. 24, 1916.
1,184,167.
Patented May 23, 1916.
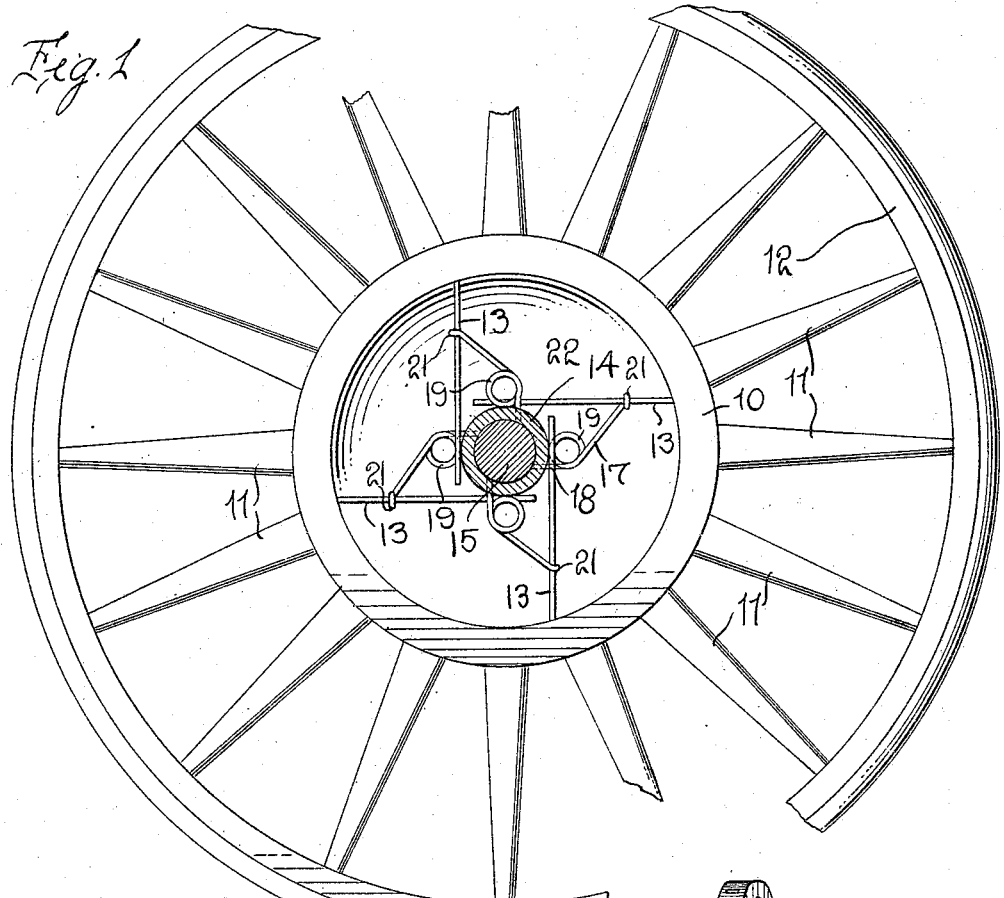
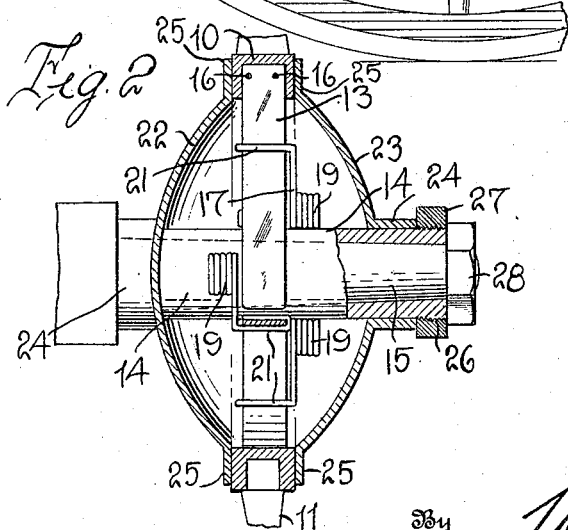
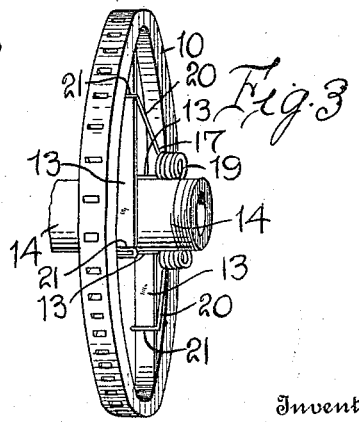
Inventor
PAUL F. COTA
By Watson E. Coleman
Attorney

UNITED STATES PATENT OFFICE.

PAUL F. COTA, OF LANGDON, ALBERTA, CANADA.

RESILIENT WHEEL.

1,184,167. Specification of Letters Patent. Patented May 23, 1916.

Application filed January 24, 1916. Serial No. 73,997.

*To all whom it may concern:*

Be it known that I, PAUL F. COTA, a subject of the King of England, residing at Langdon, in the Province of Alberta and Dominion of Canada, have invented certain new and useful Improvements in Resilient Wheels, of which the following is a specification, reference being had to the accompanying drawings.

My invention relates to resilient wheels, and more particularly to that class of resilient wheels wherein the spoke section is resiliently supported upon the hub section by means of springs.

One object of my invention is the provision of a resilient wheel of an extremely simple construction wherein the rim or spoke section may shift in all directions relative to the hub section, but in which, under normal circumstances, the rim section will be supported in concentric relation to the hub section.

A further object of the invention is the provision of means whereby the shocks to which the wheel is subjected and the stresses to which it is subjected will be resisted by springs mounted upon the rim or spoke section and by springs also mounted upon the hub section and engaging the first-named springs.

Other objects will appear in the course of the following description.

My invention is illustrated in the accompanying drawings, wherein:

Figure 1 is a side elevation of a wheel constructed in accordance with my invention, the hub being in section; Fig. 2 is a view showing in elevation the springs of the hub and the hub itself, the spoke ring and the housing plates being in section and the extremity of the axle spindle and the hub being also in section; Fig. 3 is a perspective view of the spoke ring and hub.

Referring to these figures, 10 designates a spoke ring of any suitable character and of any desired material having radiating therefrom the spokes 11 supporting the rim or felly 12. Mounted at intervals upon the spoke ring and extending inward in tangential relation to the axis of the spoke ring are a plurality of flat springs 13, the outer ends of the springs being attached to the spoke ring in any suitable manner but being shown as being inserted into the spoke ring and held in place therein by screws 16 or other attaching devices. The inner surface of the ends of the springs are spaced from each other a distance just sufficient to receive between these inner faces the hub 14. This hub, as illustrated, is cylindrical in form and is bored to receive the axle spindle 15. Mounted upon the hub are a plurality of springs, designated generally 17, and disposed in quartering relation upon the hub, each of these springs comprising a shank 18 which extends into the hub, a coil 19 and an arm 20 which extends tangentially to a circle concentric to the hub or at an angle to the shank 18. At its extremity each of the arms 17 is bent to form an elongated loop 21 which embraces the corresponding flat spring 13 closely. These springs 17 engage with the flat springs 13 intermediate their ends. These springs 17 may be either rigidly connected to the springs 13 or slidably connected to the springs. Thus if the loop 21 is closed tightly upon the springs 13, the springs 17 would be rigidly connected thereto, whereas if the loop is loose upon the springs they will be slidably connected thereto. A construction wherein the spring 20 slides through the loop 21 is particularly effective for a light load, but if, on the other hand, the spring 20 is rigidly connected to the corresponding spring 13 the construction is particularly adapted for relatively heavy loads. Either way will give a thoroughly good resilient cushion to the wheel.

In order to house and protect the springs 13 and 17, I provide the oppositely disposed housing plates 22 and 23, each of which is dish-shaped and provided with a hub portion 24 which immediately surrounds the hub 14. The outer edges of the plates are flattened, as at 25, so as to have sliding contact with the side faces of the spoke ring 10. The extremity of the hub 14 is screw threaded, as at 26, for engagement with a nut 27 which when in place holds the housing plates 23 upon the hub and the hub in turn is held in place upon the axle spindle by means of a nut 28.

The operation of my invention is as follows: Upon a depression of the hub relative to the spoke ring of the wheel, if the parts are in the position shown in Fig. 1, the lowermost horizontal spring 13 will be downwardly deflected and this will also put a strain upon the coil spring 17 connected thereto. The coil spring 17 connected to the upper flat spring 13 which flat spring happens to be in a horizontal position, will also act to flex this upper flat spring. The depression of the hub relative to the rim will also be resisted by the uppermost coil springs but not by the flat springs to which they are connected if the coil springs are rigidly connected to the flat springs. Any movement of the wheel relative to the hub or any movement of the hub relative to the wheel will cause a deflection of practically all of the springs and yet the springs will permit the hub to move into various eccentric positions relative to the spoke ring and the wheel. It will also be seen that my improved spring system acts to yieldingly resist rotary movement of the spoke ring and rim relative to the hub but permit a slight movement thereof. Thus the wheel is cushioned not only against radial shocks but against circumferential strains.

It is to be noted that the springs 17 have their coils disposed to one side of the springs 13 so that they will not interfere in any way with the action of the springs 13. Furthermore, it is to be noted that these springs 17 act to resist any lateral movement of the springs 13 and therefore of the spoke ring and rim section. This lateral movement, however, is particularly resisted by the side plates 22 and 23.

While I have illustrated a very simple form of my invention, I wish it understood that the details may be varied in many ways without departing from the spirit of the invention.

Having described my invention, what I claim is:

1. A resilient wheel including a hub, a rim section and a plurality of springs operatively connected to the rim section, extending inward and bearing at a plurality of spaced points against the hub section and having sliding engagement with the hub section, and resilient means on the hub section engaging said springs and resiliently linking them to the hub section.

2. A resilient wheel including a spoke ring, a hub, a plurality of flat springs extending inward from the spoke ring tangential to the hub and bearing slidably thereagainst at a plurality of spaced points, and a plurality of outwardly extending springs attached to the hub section and each engaging one of the flat springs intermediate its ends.

3. A resilient wheel including a spoke ring, a hub, a plurality of flat springs extending inward from the spoke ring tangential to the hub and bearing thereagainst, and a plurality of springs mounted on the hub, each spring including a coil and an arm extending outward therefrom tangential to a circle concentric to the hub and engaging with the corresponding flat spring intermediate its ends.

4. A resilient wheel including a spoke ring, a hub, a plurality of flat springs extending inward from the spoke ring tangential to the hub and bearing thereagainst, and a plurality of springs mounted on the hub at one side of the plane of the flat springs, each spring having a coil and an arm extending outward therefrom tangential to a circle concentric to the hub, said arm being angularly bent at its extremity and formed into a loop engaging with the corresponding flat spring intermediate its ends.

5. A resilient wheel including a tubular hub, a spoke ring concentric to the hub and operatively supporting a rim, a plurality of flat springs extending inward from the spoke ring and bearing against the hub in quartering relation to each other, a plurality of springs disposed in quartering relation to each other and engaged with the hub, each spring being formed with a coil disposed exteriorly of the plane of the flat spring, then extending forward and then laterally, and bent into a loop embracing the corresponding flat spring at a point intermediate its ends.

6. A resilient wheel including a spoke ring, a rim operatively connected thereto, a tubular hub, a plurality of flat springs extending inward from the spoke ring and bearing at separated points against the exterior face of the hub, and intermediate spring members engaging each flat spring intermediate its ends and engaging the hub, said spring members resisting the movement of the flat springs lengthwise or transversely.

In testimony whereof I hereunto affix my signature in the presence of two witnesses.

PAUL F. COTA.

Witnesses:
ENOCH T. MORE,
JAMES F. MCLOUD.

Copies of this patent may be obtained for five cents each, by addressing the "Commissioner of Patents, Washington, D. C."